US008426805B2

(12) United States Patent
McCauley

(10) Patent No.: US 8,426,805 B2
(45) Date of Patent: Apr. 23, 2013

(54) METHOD AND APPARATUS FOR RESPONSE AND TUNE LOCKING OF A MASS SPECTROMETER

(75) Inventor: Edward B. McCauley, Cedar Park, TX (US)

(73) Assignee: Thermo Finnigan LLC, San Jose, CA (US)

( * ) Notice: Subject to any disclaimer, the term of this patent is extended or adjusted under 35 U.S.C. 154(b) by 818 days.

(21) Appl. No.: 12/026,498

(22) Filed: Feb. 5, 2008

(65) Prior Publication Data

US 2009/0194681 A1 Aug. 6, 2009

(51) Int. Cl.
*B01D 59/44* (2006.01)

(52) U.S. Cl.
USPC .......... 250/282; 250/281

(58) Field of Classification Search .......... None
See application file for complete search history.

(56) References Cited

U.S. PATENT DOCUMENTS

| | | | | |
|---|---|---|---|---|
| 3,510,647 A | | 5/1970 | Wood | |
| 3,823,315 A | * | 7/1974 | Mosharrafa | 250/283 |
| 3,920,986 A | * | 11/1975 | Fies, Jr. | 250/282 |
| 3,946,229 A | * | 3/1976 | Moseman et al. | 250/292 |
| 4,105,916 A | * | 8/1978 | Siegel | 250/282 |
| 4,808,820 A | * | 2/1989 | Blau | 250/281 |
| 4,847,493 A | * | 7/1989 | Sodal et al. | 250/252.1 |
| 4,851,673 A | * | 7/1989 | Izumi et al. | 850/9 |
| 4,968,885 A | * | 11/1990 | Willoughby | 250/288 |
| 5,285,064 A | * | 2/1994 | Willoughby | 250/288 |
| 5,545,895 A | * | 8/1996 | Wright et al. | 250/282 |
| 6,080,985 A | * | 6/2000 | Welkie et al. | 250/287 |
| 6,452,167 B1 | * | 9/2002 | Felter | 250/292 |
| 6,884,996 B2 | * | 4/2005 | Senko | 250/282 |
| 6,998,607 B1 | * | 2/2006 | Davis et al. | 250/287 |
| 7,047,144 B2 | * | 5/2006 | Steiner | 702/64 |
| 7,053,365 B2 | * | 5/2006 | Shimomura | 250/281 |
| 7,323,682 B2 | * | 1/2008 | McCauley et al. | 250/287 |
| 7,420,161 B2 | * | 9/2008 | Kovtoun | 250/293 |
| 7,482,581 B2 | * | 1/2009 | Lange et al. | 250/282 |
| 7,507,954 B2 | * | 3/2009 | McCauley et al. | 250/288 |
| 2003/0015658 A1 | * | 1/2003 | Felter | 250/292 |
| 2006/0261266 A1 | * | 11/2006 | McCauley | 250/287 |
| 2009/0032702 A1 | * | 2/2009 | Quarmby et al. | 250/288 |
| 2009/0194681 A1 | * | 8/2009 | McCauley | 250/282 |

FOREIGN PATENT DOCUMENTS

| | | | |
|---|---|---|---|
| EP | 0 317 060 A2 | | 5/1989 |
| EP | 317060 A2 | * | 5/1989 |

OTHER PUBLICATIONS

"Shimadzu—GCMS-QP2010/2010s iSolutions for GC/MS," Brochure, Rev 6/05, p. 4, (2002).

* cited by examiner

*Primary Examiner* — David A Vanore
*Assistant Examiner* — Andrew Smyth
(74) *Attorney, Agent, or Firm* — Haynes & Boone, LLP; Charles B. Katz; Thomas F. Cooney

(57) ABSTRACT

A mass spectrometer and a technique for operating it involve setting an operating parameter that influences a rate of flow of electrons from an electron source into an ion volume so that ions produced from a material in the ion volume in response to electrons satisfy an ion production target, performing a plurality of analytical runs using the mass spectrometer with the electron source while monitoring an operational characteristic, and adjusting the operating parameter in response to the monitoring to compensate for a change over time in the operational characteristic in a manner so that the ion production target remains satisfied.

12 Claims, 2 Drawing Sheets

METHOD AND APPARATUS FOR RESPONSE AND TUNE LOCKING OF A MASS SPECTROMETER

TECHNICAL FIELD

This invention relates in general to mass spectrometers and, more particularly, to a mass spectrometer having an ion source for producing ions of a sample material.

BACKGROUND

Existing mass spectrometers have an ion source that produces ions of a sample material, and also ions of an internal standard that is mixed with the sample material. These ions are then processed by a mass analyzer which includes a mass detector. Some existing ion sources produce ions using a technique known as electron ionization (EI). A different type of ion source produces ions using a technique known as chemical ionization (CI). In many applications, the mass spectrometer is configured to operate under conditions of higher sensitivity than what is required for accurate qualitative and quantitative analysis. In other words, the quantity of ions produced in the ion volume is much more than what is required for a detection limit of the analysis at hand. When the mass spectrometer is operated in this manner, the instrument can suffer a faster contamination and decay rate. The contamination can cause the sensitivity, tuning and accuracy of mass identification to change over time. As a result, the quality of the analytical data can vary from sample to sample within an analytical batch of samples. Additionally, more frequent calibration and tuning is needed, and more frequent maintenance is needed to clean the ion source and other components of the mass spectrometer, all of which are undesirable.

Several approaches have been used to increase the operational lifetime of the ion source at the expense of giving up some instrument sensitivity. For example, a split mode injection or a sample extract dilution may be utilized. Although these approaches have been generally adequate for their intended purposes, they have not been satisfactory in all respects. As one example, surface active analytes may tail excessively as the chromatographic integrity diminishes, which might otherwise be masked by higher level of analytes. As another example, thermally labile components may react in the hot ion volume of the mass spectrometer or injection port of the gas chromatograph thereby generating poor responses relative to their internal standard, which might also benefit from higher levels of analyte. This is the case with certain routine analytical protocols such as EPA (Environmental Protection Agency) Method 8270, where such adverse performance precludes further analysis.

SUMMARY

One of the broader forms of the invention involves a method for operating a mass spectrometer including: setting an operating parameter that influences a rate of flow of electrons from an electron source into an ion volume so that ions produced from a material in the ion volume in response to electrons satisfy an ion production target, performing a plurality of analytical runs using the mass spectrometer with the electron source while monitoring an operational characteristic, and adjusting the operating parameter in response to the monitoring to compensate for a change over time in the operational characteristic in a manner so that the ion production target remains satisfied.

Another of the broader forms of the invention involves an apparatus including a mass spectrometer that includes structure defining an ion volume, an electron source for supplying electrons to the ion volume, and a controller. The controller: sets an operating parameter that influences a rate of flow of electrons from the electron source into the ion volume so that ions produced from a material in the ion volume in response to electrons satisfy an ion production target, performs a plurality of analytical runs using the mass spectrometer with the electron source while monitoring an operational characteristic, and adjusts the operating parameter in response to the monitoring to compensate for a change over time in the operational characteristic in a manner so that the ion production target remains satisfied.

DETAILED DESCRIPTION

Figure 1:
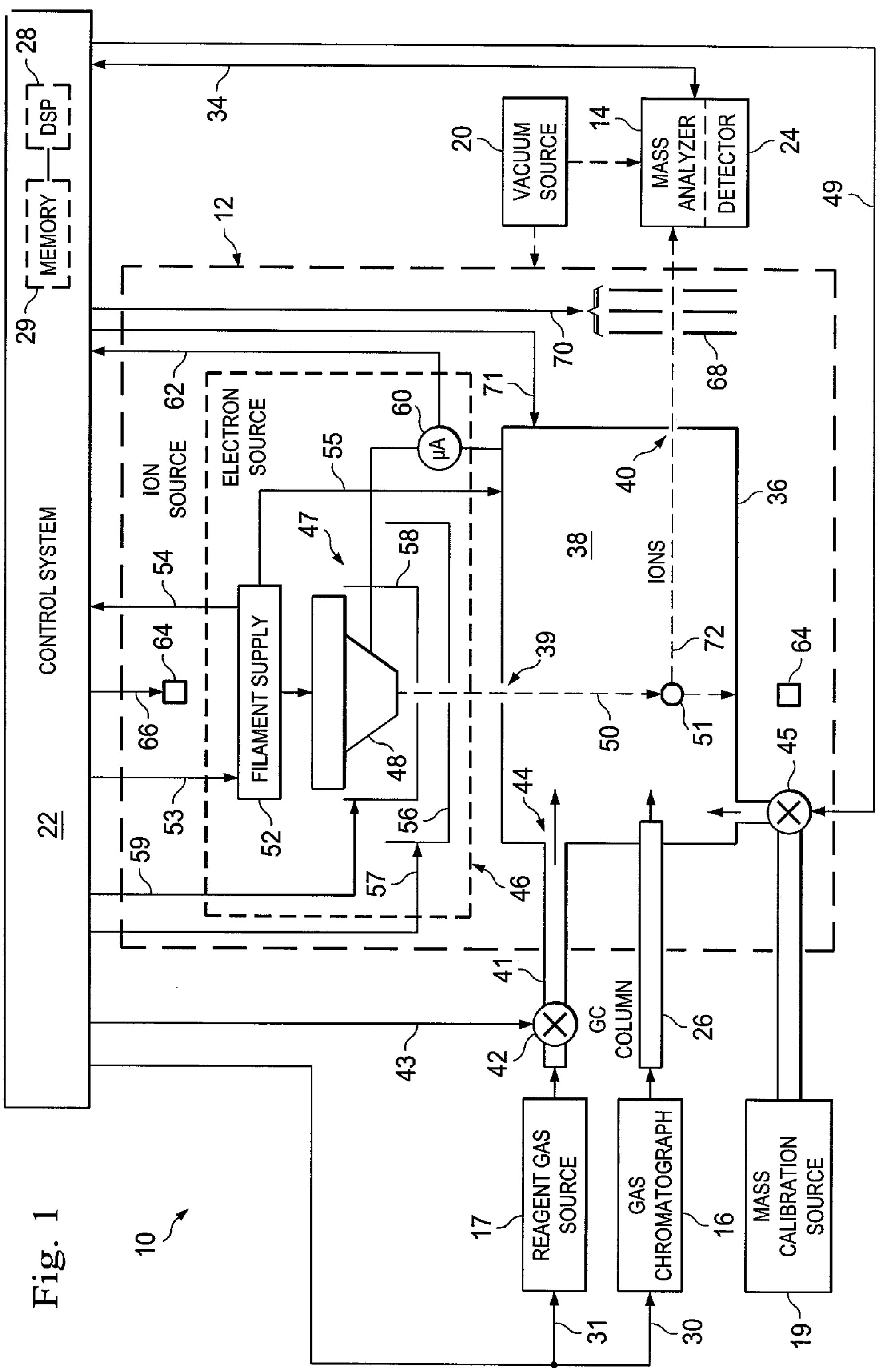
FIG. 1 is a block diagram of a mass spectrometer that embodies aspects of the present invention.

FIG. 1 is a block diagram of a mass spectrometer (MS) 10 that embodies aspects of the present invention. The mass spectrometer 10 includes an ion source 12, a mass analyzer 14, a gas chromatograph 16, a source 17 of a reagent gas, a source 19 of a mass calibration standard, a vacuum source 20, and a control system 22. The disclosed mass spectrometer 10 is configured for chemical ionization (CI), but could alternatively be configured for electron ionization (EI).

The mass analyzer 14 is a type of device that is known in the art, and in fact could be any of a number of commercially-available devices. The mass analyzer 14 may include a not-illustrated device to separate ions based on their mass-to-charge ratios, examples of which include but are not limited to a quadrupole filter, a linear ion trap, a rectilinear ion trap, a three-dimensional ion trap, a cylindrical ion trap, a Fourier transform ion cyclotron resonance filter, an electrostatic ion trap, a Fourier transform electrostatic filter, a time-of-flight filter, a quadrupole time-of-flight filter, a hybrid analyzer, or a magnetic sector. Further, the mass analyzer 14 includes a detector 24 that can detect ions. The detector 24 generates an electrical signal that corresponds to an ion intensity (quantity of ions) detected by the detector, and the signal is transmitted to the control system 22 for processing. The detector 24 has a gain that varies in response to a gain control signal sent from the control system 22.

The gas chromatograph 16 is also a known type of device, and could be any of a number of commercially-available devices. The gas chromatograph 16 serves as a source of particles of a sample material that are referred to as analytes. In particular, the gas chromatograph 16 outputs analytes that are atoms or molecules of the sample material in a gas phase. The sample analytes delivered by the gas chromatograph 16 travel to the ion source 12 through a gas chromatograph (GC) column 26 of a known type. For example, the GC column 26 may be a fused silica capillary tube of a type well known in the art. Alternatively, instead of the gas chromatograph 16 and GC column 26, the sample analytes may optionally be generated by a liquid chromatograph (LC) and delivered by an LC column. The term "mass" is sometimes used herein as an abbreviation for mass-to-charge ratio (m/z). In GC/MS, almost all ions are singly charged, so the mass is equal to the mass-to-charge ratio.

The reagent gas source 17 is also a known type of device, and produces a flow of a reagent gas such as methane. The internal standard source (not shown) serves as a source for one or more internal standards. The internal standards are periodically used to evaluate the operation of the mass spectrometer 10. The internal standards are added to the sample material (such as a sample extract) to be analyzed. Each internal standard is selected to produce ions of a target mass-to-charge ratio (or "mass"), and a predefined ion intensity is associated with the target mass. The predefined ion intensity may be a value suggested by the manufacturer of the mass spectrometer 10, but more typically is determined separately by each end user, using testing and experimentation with the internal standard. The internal standards can be selected to produce ions with respective different target masses that cover a range of masses from low to high masses. One or more of the internal standards are added to the sample material that is to be analyzed, in a manner discussed later.

The mass calibration source 19 serves as a source for a plurality of mass-to-charge ratios. The mass calibration standard is used to tune and calibrate the mass spectrometer 10, in a manner discussed later. The mass calibration standard may be delivered to the ion volume 38 directly, or indirectly via introduction into a vacuum manifold housing the ion source 12. The mass calibration standard can include calibration standards such as FC-43 (perfluorotributylamine, also referred to as "PFTBA") or other suitable compounds. The calibration standards have known mass spectrums, and are used to ensure that the mass spectrometer 10 accurately assigns appropriate masses to detected ions. The mass calibration standard may further function as a tuling standard for adjusting the tuning of the mass spectrometer 10. FC-43 for example may also be used as a tuning standard. Additionally, other known tuning standards may optionally be used as well. For example, decafluorotriphenyl phosphine (referred to as "DFTPP") is a common internal tuning standard used to validate appropriate instrument tuning. A tuning standard ensures that ion ratios (relative ion abundances) across a range of masses are detected accurately by the mass spectrometer 10. Further, the tuning standard can be used to verify proper adjustment of resolution, peak shape, isotope ratios, and detector zero. The vacuum source 20 is a known type of system, and is operatively coupled to both the ion source 12 and the mass analyzer 14, in order to maintain a vacuum in interior regions during normal operation.

The control system 22 includes circuitry of a known type, and is operatively coupled to various other components of the mass spectrometer 10. In the disclosed embodiment, the control system 22 includes a digital signal processor (DSP) that is indicated diagrammatically at 28. The DSP 28 executes a software program that determines how the control system 22 controls other components of the mass spectrometer 10. The software program also processes data associated with analytical runs of a sample material. For example, the software program includes a scaling factor that scales an ion intensity detected by the detector 24. The control system 22 further includes memory 29 for storing software programs, analytical data, and other information associated with the operation and functionality of the mass spectrometer 10. The DSP 28 could alternatively be a microcontroller, or some other form of digital processor. As another alternative, the DSP 28 could be replaced with a state machine or a hardwired circuit.

The control system 22 includes an output 30 that controls the gas chromatograph 16 and an output 31 that controls the reagent gas source 17. The control system 22 further includes a line 34 that communicates with the mass analyzer 14 for transmitting and receiving data. In addition, the control system 22 includes other outputs that control various other components of the mass spectrometer 10, in a manner discussed later. It is to be understood that line 34 and the other lines to and from the controller may be provided by either a wired or a wireless transmission, or both.

The ion source 12 has therein an electrically conductive housing 36 with a chamber serving as an ion volume 38. The housing 36 has two openings 39 and 40 that provide communication between the ion volume 38 and the exterior of the housing. The opening 39 serves as an electron opening or an electron inlet port, and the opening 40 serves as an ion opening or an ion outlet port in a manner discussed herein. A gas supply conduit 41 extends from the reagent gas source 18 to the housing 36, and an electrically-operated valve 42 is provided along the conduit to control gas flow through the conduit. The valve 42 is controlled by an output 43 of the control system 22. The conduit 41 opens into the ion volume 38 through a gas inlet port 44. The end of the GC column 26 remote from the gas chromatograph 16 has an end portion that projects a short distance into the ion volume 38 through an opening in the housing 36. A conduit extends from the mass calibration source 19 to the housing 36, and an electrically-operated valve 45 is provided along the conduit to control a flow of a mass calibration standard into the ion volume 38. The valve 45 is controlled by an output 49 of the control system 22.

The ion source 12 includes near the housing 36 an electron source 46. The electron source 46 includes a filament assembly 47 having a filament 48 that serves as an electron emitter, and that may be of a thermionic emitter type. Alternatively, instead of using a thermionic emitter such as filament 48, the electron emitter may optionally be a field emitter. The filament 48 has generally a hairpin configuration and is positioned along an imaginary line 50 that extends through the electron inlet port 39 and into the ion volume 38. The filament 48 has an emission section generally centered on the imaginary line 50. The filament 48 may be made of rhenium. Alternatively, the filament 48 may optionally include tungsten, thoriated tungsten, thoriated tungsten rhenium, thoriated iridium, yttria coated rhenium, or any other suitable material. Alternatively, the filament 48 may optionally include ribbon filaments and coil filaments.

The electron source 46 includes a filament supply 52. The filament supply 52 can selectively energize the filament 48 with a filament current. When energized, the filament 48 emits a stream of electrons that propagates along the imaginary line 50 through the electron inlet port 39 to a target location 51, which may be a point or region within the ion volume 38. The filament supply 52 is controlled by an output 53 of the control system 22.

When energized, the filament 48 is negatively biased with respect to the ion volume 38. The filament supply 52 includes an output 55 coupled to the ion volume 38, to establish a difference in potential. The difference in potential between the ion volume 38 and the filament 48 establishes the energy of the electrons as they travel to the ion volume. The filament supply 52 also includes an output 54 coupled to the control system 22 that indicates to the control system when there is a problem with the filament 48 such as a burnout condition.

The electron source 46 further includes an electron gate 56 of a known type. The electron gate 56 is provided between the filament 48 and the electron inlet port 39. The electron gate 56 is controlled by an output 57 of the control system 22. The output 57 carries a control signal having a duty cycle. The duty cycle determines the percentage of time that the gate is "open." The duty cycle may vary over a range from 0% to 100%. When the electron gate 56 is open, the stream of electrons flowing along line 50 propagates through the gate and into the ion volume 38. On the other hand, when the electron gate 56 is closed, it interrupts the stream of electrons, so that the stream of electrons is inhibited from traveling to and entering the ion volume 38. The duty cycle can be varied by using a fixed frequency and varying the pulse width, or by using a fixed pulse width and varying the frequency, or by varying both the frequency and pulse width. It is desirable that sufficient pulses per amu (atomic mass unit) are delivered for scanning instruments such as quadrupoles or magnetic sectors in order to preserve adequate peak profiling and centroiding. Typically, this is accomplished by providing ten or more pulses per amu scanned by a quadrupole instrument. By varying the duty cycle, the quantity of electrons reaching the ion volume 38 over time is varied, and thus the quantity of ions (ion population) produced in the ion volume also varies. This time based approach is linear and predictable throughout the range of pulsed duty cycles.

The electron source 46 further includes an electron lens 58 of a known type. For example, the electron lens 58 may include one or more lens(es) that can be operated in a focusing mode. The electron lens 58 may be part of the filament assembly 47. The electron lens 58 is controlled by an output 59 of the control system 22. The electron lens voltage positively biases the electron lens 58 with respect to the ion volume 38. The control system 22 can vary the electron lens voltage via output 59 and thus, can vary the focusing of the stream of electrons flowing towards the ion volume 38. Although the electron gate 56 and electron lens 58 are shown as separate components, it is understood that they may be combined into a single component that provides both functionalities.

The electron source 46 further includes an electron emission sensor 60 for measuring an emission current of the filament 48 when energized with a filament current. The measured emission current can be transmitted to the control system 22 on line 62 for processing. The control system 22 can use the emission current information to control and set the filament current supplied from the filament supply 52, in a manner discussed later.

The ion source 12 includes a magnetic field generator 64. The magnetic field generator 64 generates a magnetic field that is aligned parallel with the imaginary line 50 to help keep the stream of electrons collimated. The magnetic field generator 64 is controlled by an output 66 of the control system 22. Accordingly, the control system 22 can selectively vary the strength of the magnetic field by a control signal sent on output 66. In the disclosed embodiment the magnetic field generator 64 is an electromagnet. Alternatively, however, it could be a permanent magnet, or include a portion that generates a constant magnetic field (such as permanent magnets), along with a further portion such as an electromagnet that generates a variable magnetic field. The ion source 12 further includes a set of lens elements 68 of a known type. The lens elements 68 are disposed between the ion volume 38 and the mass analyzer 14. The lens elements 68 are controlled by one or more outputs 70 of the control system 22.

In the disclosed embodiment, the ion volume 38 is used for chemical ionization (CI). The general principles of CI are known in the art, and are therefore described only briefly here, and not in detail. During operation, the valve 42 remains open to allow a continuous flow of the reagent gas to pass through the conduit 41 and into the ion volume 38. As shown diagrammatically in FIG. 1, the ion volume 38 has only a few very small openings, including openings 39 and 40. Thus, due to these relatively small openings 39 and 40 and also the flow of reagent gas into the interior of the ion volume 38, the ion volume 38 is maintained at a relatively high pressure. The gas chromatograph 16 contains at least one of a sample material, an internal standard, and an external standard, and produces analytes of the sample and/or standard such as atoms or molecules thereof, which are supplied through the GC column 26 in a gas phase to the ion volume 38.

The control system 22 instructs the filament supply 52 to energize the filament 48 with a filament current, and in response the filament emits a stream of electrons. The control system 22 controls the electron gate 56 with a control signal having a duty cycle which determines the percentage of time the gate is "open." A typical "on" potential for he electron gate 56 is +15V whereas a typical "off" potential for the gate is −75V for an electron beam with 70 eV of energy. (These potentials are typical when the electron gate 56 and electron lens 58 are a common electrode.) When the electron gate 56 is open and allows the stream of electrons to flow along line 50 and enter the ion volume 38, the electrons collide primarily with molecules of the high pressure reagent gas to form ions of the reagent gas. The stream of electrons is influenced by the electron lens voltage of the electron lens 58 and the magnetic field generated by the magnetic field generator 64 as previously discussed. When the electron gate 56 is closed, the stream of electrons is blocked and no electrons enter the ion volume 38.

The relatively high pressure within the ion volume 38 ensures a density of the reagent gas that promotes such collisions in order to produce ions of the reagent gas. The ions of the reagent gas then react with the analytes of the sample/standard gas in order to form ions characteristic of the individual analytes. Gas flowing out of the ion volume 38 through the ion outlet port 40 carries with it these ions.

The control system 22 applies an electrical potential to the ion volume 38 through a control line 71, and also applies at least one electrical potential to the lens elements 68. The potential between the ion volume 38 and lens elements 68 extracts and focuses the ions of sample and/or standard material generated within the volume 38. In particular, the ions travel along a path 72 from the ion volume 38, through the outlet 40, and through the lens elements 68 to the mass analyzer 14. The path 72 of ion travel is approximately perpendicular to the stream of electrons flowing along the line 50. The mass analyzer 14 scans across a range of masses and can selectively filter out ions of a particular mass for detection by the detector 24. The detector 24 detects an ion intensity (quantity of ions) for that particular mass and generates an electrical signal corresponding to the detected ion intensity. The detected ion intensity information is sent on line 34 to the control system 22. The control system 22 executes a software program that processes the information and generates a mass spectrum of the sample/standard material.

Even though the description above relates to a mass spectrometer 10 operating by CI, the mass spectrometer 10 may alternatively be configured to operate by electron ionization (EI). In the case of EI, no reagent gas from source 17 is supplied to the ion volume 38, openings 39 and 40 may be made larger, and ions characteristic of the sample material are formed directly from interaction of the sample material with the electrons.

Tuning and mass calibration processes are performed on the mass spectrometer 10 to ensure that the mass spectrometer generates accurate and consistent data when running samples for an analysis. The tuning process which typically utilizes a mass calibration standard such as FC-43 ensures that the resolution and detected ion intensities (ion abundances) across a range of masses will be at appropriate levels relative to each other when analyzing an unknown material. In other words, the process evaluates whether the relative quantity of ions detected across the range of masses is accurate when using the known material such as FC-43. The mass calibration process ensures that the mass spectrometer will accurately assigns masses to the ions produced when analyzing an unknown material. In addition to tuning and mass calibration, GCMS systems typically require multipoint calibration curves for targeted analytes when performing quantitative chemical analysis.

In each of the tuning and mass calibration processes, the control system 22 opens the valve 45 and instructs the mass calibration source 19 to deliver a tuning standard such as FC-43 or a mass calibration standard such as FC-43 into the ion volume 38. The ions of FC-43 produced in the ion volume 38 in response to electrons from the filament 48 are processed by the mass analyzer 14 for detection by the detector 24. The control system 22 executes a program that processes data from the mass analyzer 14 and detector 24, and generates a mass spectrum of the FC-43. The generated mass spectrum is compared with FC-43 tuning and calibration criteria established by an industry standard to ensure that detected ion ratios (relative ion abundances across a range of masses) and detected masses (identifying ions), respectively, are accurate and consistent for the mass spectrometer 10. After tuning the mass spectrometer 10 with a tuning standard such as FC-43, in some circumstances it may be necessary to verify proper tuning with a different standard introduced through the gas chromatograph 16. For example, Environmental Protection Agency (EPA) Method 8270 requires that tuning be verified with DFTPP.

If the generated mass spectrum does not meet the tuning criteria, various parameters for the components of the mass spectrometer 10 are adjusted until the tuning criteria are met. The parameters that may be adjusted include, but are not limited to, the emission current of the filament 48 (by setting the filament current), the ion energy, the electron lens voltage of the electron lens 58, the duty cycle for the electron gate 56, the magnetic field generated by the magnetic field generator 64, the voltage of the lens elements 68, the operation of the mass analyzer 14, and the gain of the detector 24. In addition, these parameters may be adjusted as a function of the mass currently being scanned by the mass analyzer such as a quadrupole or magnetic sector, or adjusted across short mass ranges such as segmented scanning on ion traps or time-of-flight (TOF) mass spectrometers.

In the tuning and calibration discussed above, an effective emission current from the filament 48 is established which is significantly lower than the actual emission current. That is, the mass spectrometer 10 is tuned and calibrated in a manner traditional to the art, and then the sensitivity is attenuated by operating the electron gate 56 at a reduced duty cycle. This establishes a low nominal value for the effective filament emission current (the rate of flow of electrons to the ion volume 38). The effective filament emission current is dependent on the filament current supplied to the filament 48 and the duty cycle of the electron gate 56. For example, if a 5% duty cycle for the electron gate 56 is used with a filament 48 that delivers an emission current of 100 μA (when energized by an appropriate filament current), the result is an effective filament emission current of 5 μA. In the disclosed embodiment, the effective filament emission current is initially set for operating the mass spectrometer 10 at a sensitivity level just great enough for what is required for the analysis at hand. That is, when the mass spectrometer 10 is operated using a 100% duty cycle for the electron gate 56 (always open), the effective emission current has a value that provides an ion intensity corresponding to a greater sensitivity than what would be needed from the mass spectrometer. Stated differently, the sensitivity range of the mass spectrometer is selectively positioned so that it encompasses the levels of sensitivity that will be needed during normal operation. From the maximum sensitivity level, the duty cycle then is adjusted to achieve an effective filament emission current at the low nominal value. The low nominal value is typically specified by the particular end user, and corresponds to the desired sensitivity level for an analysis to be performed. There are also other techniques to establish the effective filament emission current.

In the discussed embodiment, the initial duty cycle for the electron gate 56 is selected to produce a minimum quantity of ions that is required to meet a detection limit for all analytes in the method used for the analysis. In other words, the mass spectrometer 10 is operated under a sensitivity level that is adequate and suited for detecting ions produced from all analytes that may be determined by the method used. However, it is understood that the level of sensitivity may vary, and will typically depend on the requirements of the end user.

Additionally, the duty cycle for the electron gate 56 may vary across the range of masses to achieve proper tuning (i.e., proper detection of ion ratios) of the mass spectrometer 10. For example, the overall range of masses is divided into several mass ranges, and the duty cycle used for each mass range may be different than the duty cycle used for the other mass ranges. In operation, the mass analyzer 14 scans for ions produced in the ion volume 38 across the range of masses, from low to high or high to low, for detection by the detector 24. The duty cycle will thus typically change as the mass analyzer 14 is analyzing ions and moves from mass range to mass range. A waveform or profile representing a relationship between duty cycle and mass ranges can be determined, and applied during sample runs performed later.

Following the tuning and calibration processes, the current parameters are stored in memory 29 for future use when tuning and calibrating the mass spectrometer 10. In this example, the mass spectrometer 10 is operated to analyze sample materials under a regulatory standard such as EPA Method 8270. EPA Method 8270 is used to determine semi-volatile organic compounds by gas chromatography mass spectrometry (GC/MS). EPA Method 8270 requires verification of the tuning and calibration of the mass spectrometer 10 before the analysis can begin. The verification is performed by delivering an external tuning standard such as DFTPP to the gas chromatograph 16 and operating the mass spectrometer 10 to generate a mass spectrum of DFTPP. EPA Method 8270 has set guidelines for the DFTPP tune and calibration criteria that must be satisfied. Thus, the generated mass spectrum of DFTPP is compared to the DFTPP tune and calibration criteria for the verification. If necessary, parameters of the mass spectrometer 10 can be adjusted as necessary to bring the tuning of the mass spectrometer into conformity with the DFTPP tuning criteria.

Following successful verification, the analysis of a sample material is performed using the mass spectrometer 10. The mass spectrometer 10 is operated at the desired sensitivity level specified by the end user. The analysis includes performing a plurality of analytical runs with the sample material. The number of analytical runs may vary with the method used and/or requirements of the end user. The sample materials are prepared according to an industry standard. For each sample run, the sample material is delivered to the gas chromatograph 16 and analytes of the sample material flow into the ion volume 38. Ions characteristic of the sample material are produced in a manner previously discussed, and are detected by the detector 24. A mass spectrum of the sample material is generated and is part of a data set for the analysis. A response of the mass spectrometer 10 is monitored as discussed below, and is used to make compensating adjustments over time to the duty cycle for the electron gate 56 as the instrument sensitivity degrades over time. In other words, the duty cycle is adjusted to lock the sensitivity level of mass spectrometer 10 at a substantially fixed level over time.

In each of the analytical runs, an internal standard is typically added to the sample material, and the resulting mixture is delivered to the gas chromatograph 16. As previously discussed, the internal standard response is attenuated by reducing the duty cycle of the electron gate 56 to produce a predefined ion intensity of a target mass in the range of masses. Preferably the target mass is chosen to be close to a selected mass of the ions expected to be produced from the sample material. That is, the ions characteristic of the internal standard and certain ions characteristic of the sample material each have masses that are within a small range of each other. Accordingly, by monitoring the ion intensity of the target mass, the mass spectrometer 10 can evaluate the accuracy of the ion intensity of the similar mass produced from the sample material.

The internal standard response is used to adjust or "creep" the duty cycle of the electron gate 56 over time as the ion source 12 and other optical components of the mass spectrometer 10 become contaminated or degrade over time. In other words, the ion source 12 as well as other components of the mass spectrometer 10 may become contaminated and dirty over time, and thus the instrument sensitivity may fall below the required level as specified by the end user. That is, the quantity of ions produced may no longer be enough to satisfy the detection limit of the analysis. Accordingly, by slightly increasing the duty cycle for the electron gate 56, the quantity of ions produced in the ion volume also increases slightly in a linear and predictable manner. This process can be done without calibration or use of an external standard, which would be time consuming and require that the sample run already in progress be scrapped. This type of adjustment to a parameter such as the duty cycle does not typically involve a large change in the parameter at any point, but instead a very small change from time to time. Moreover, although it is possible to make such a change based on the results of a single analytical run, it is usually beneficial to base any change on a history of several analytical runs.

The control system 22 executes a program that evaluates the detected ion intensity produced from the internal standard in response to electrons from the electron source 46. The detected ion intensity is compared to the predefined ion intensity for the internal standard. The duty cycle is then accurately adjusted to compensate for any difference between the detected ion intensity of the internal standard and the predefined ion intensity associated with the internal standard. In the disclosed embodiment, the duty cycles used for each of the different mass ranges are adjusted by the same amount based on this difference. Thus, the mass spectrometer 10 is operated under a substantially fixed sensitivity level (as specified by the end user), and the data sets generated by all the sample runs are consistent in data quality with one another regardless of when any sample run was performed throughout the lifetime of the ion source 12 (i.e., first sample run to last sample run).

The adjustment in the duty cycle for the electron gate 56 can be performed on a run to run basis. Since the initial duty cycle was selected to provide an effective emission current with a low nominal value, the duty cycle can be progressively adjusted from a low to high value as the instrument sensitivity degrades. The effective emission current is typically increased in steps of a few micro amps or a fraction of a micro amp, by precisely adjusting the duty cycle for the electron gate 56. Further, this "creep" facilitates operating the mass spectrometer 10 at a sensitivity level for which the operational lifetime and stability of the ion source 12 is increased, as compared to operating the mass spectrometer with a higher sensitivity than what is required for the analysis.

Between any of the analytical runs, the tuning standard of DFTPP may be used to "creep" the tune of the mass spectrometer 10 as the ion source 12 and other optical components of the mass spectrometer 10 become contaminated or degrade over time. In other words, the current waveform or profile representing the relationship between the duty cycle across the ranges of masses may no longer be optimal for the current operating conditions of the mass spectrometer 10. The DFTTP may be spiked into any or all of the samples being run, or introduced separately as a tune verification and adjustment standard. The sample of DFTPP is injected into the gas chromatograph 16 and ions are formed in the ion volume 38. A mass spectrum is generated and is evaluated for compliance with the DFTPP tuning criteria. If any of the ion ratios begin to drift within the window of acceptability of the DFTPP tuning criteria, a relative adjustment is made in the duty cycles associated with the ion ratios in order to compensate for the drift. The adjustment is based on the difference between the detected ion intensities and those observed for the tuning standard when the criteria were initially verified. Stated differently, the waveform or profile representing the relationship between duty cycle and mass ranges is adjusted, and the adjusted waveform or profile is thereafter applied during future sample runs. Thus, this facilitates locking the tune profile for the mass spectrometer 10. The process of "creeping" the tune is preferably performed before the process of "creeping" the instrument sensitivity. Alternatively, the process of "creeping" the tune may optionally be performed after the process of "creeping" the instrument sensitivity.

Figure 2:
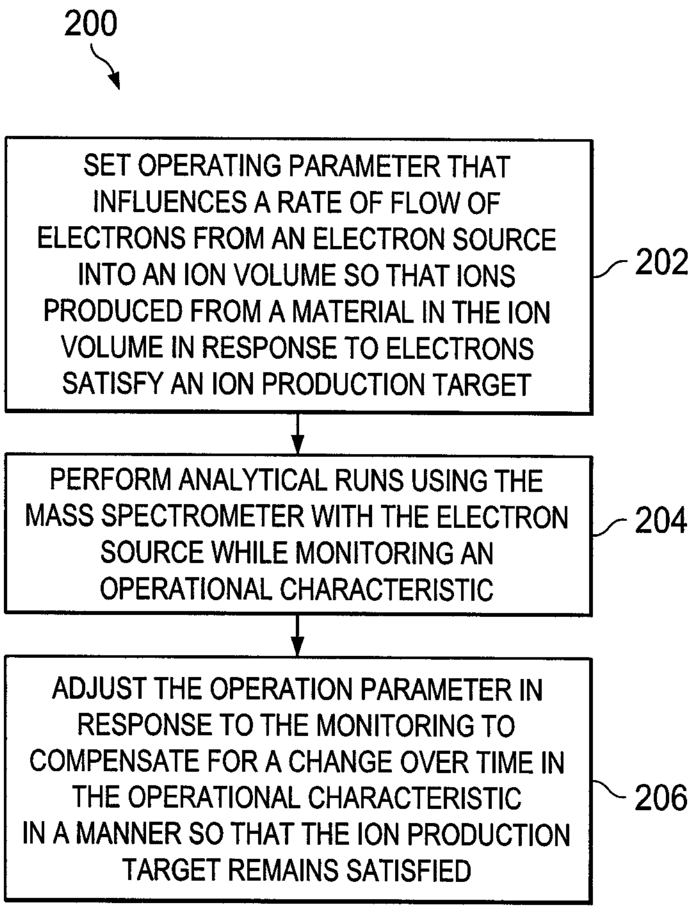
FIG. 2 is flowchart of a method of operating the mass spectrometer of FIG. 1.

FIG. 2 is a flowchart for a method 200 of operating the mass spectrometer 10 of FIG. 1. The method 200 begins with block 202 in which an operating parameter (such as the duty cycle of the electron gate 56) is set and influences a rate of flow of electrons (such as an effective emission current) from an electron source (such as the filament 48) into an ion volume (such as the ion volume 38) so that ions produced from a material (such as a sample or a tuning or calibration standard) in the ion volume in response to electrons satisfy an ion production target (such as a minimum quantity of ions that is required to meet a detection limit of an analysis). The method 200 continues with block 204 in which a plurality of analytical runs (such as analytical runs of sample materials) are performed while monitoring an operational characteristic (such as an ion intensity produced from an internal standard). The method 200 continues with block 206 in which the operating parameter is adjusted in response to the monitoring to compensate for a change over time in the operational characteristic, in a manner so that the ion production target remains satisfied. The method 200 provides the ability to produce the same quantity of analyte ions for a given amount of analyte neutrals regardless of ion source efficiency degradation.

In an alternative embodiment, two internal standards may optionally be added to the sample material instead of one internal standard. The two internal standards may include an internal standard that is configured to produce ions having a low target mass and an internal standard that is configured to produce ions having a high target mass. The control system 22 executes a program that evaluates the detected ion intensities produced by each standard in response to electrons from the electron source. The detected ion intensity of the low target mass is compared to a predefined ion intensity of the internal standard for the low target mass, and the detected ion intensity of the high target mass is compared to a predefined ion intensity of the internal standard for the high target mass. Differences between the detected ion intensities and the respective predefined ion intensities are determined, and an average value for the differences is determined. The duty cycle for each mass range is then accurately adjusted based on the average value. That is, the waveform or profile representing the relationship between duty cycle and mass ranges can be uniformly adjusted by the same amount based on this average value. Alternatively, a trend line for the differences of the low target mass and/or the high target mass may optionally be used as the basis for the adjustment instead of the average value.

In another alternative embodiment, the parameter that is adjusted involves the emission current of the filament instead of the duty cycle for the electron gate 56. As previously discussed, the control system 22 includes an output 53 that controls the filament supply 52 which supplies a filament current to the filament 48. The filament 48 emits electrons at a rate that is called the emission current. The emission current is measured by the sensor 60 and the information is sent to the control system 22. Accordingly, the control system 22 can adjust the filament current to vary the emission current and thus, vary the rate of flow of electrons to the ion volume 38. Accordingly, the ion intensity (quantity of ions) produced in the ion volume 38 is varied as well. It has been observed that the relationship between the filament current and the emission current is non-linear. Thus, to achieve a desired ion intensity, an iterative process of adjusting the filament current to generate an appropriate emission current may be performed.

In summary, aspects of the present disclosure provide a method and apparatus for reducing the contamination rate of the ion source by limiting ion production to a minimum level that is consistent with producing a desired sensitivity. Further, the present disclosure provides a method and apparatus for response and tune "locking" of the instrument so that every sample within the analytical batch is of similar data quality.

Although several embodiments have been illustrated and/or described in detail, it will be understood that they are exemplary, and that a variety of substitutions and alterations are possible without departing from the spirit and scope of the present invention, as defined by the following claims. For example, more than two internal standards may be used to determine the required adjustment to a parameter so that the mass spectrometer operates under a constant sensitivity level for all sample runs in an analysis. That is, three, four, five, or any number of internal standards may be used to sufficiently cover the range of mass-to-charge ratios of the mass spectrometer. Further, even though some embodiments are described with reference to EPA Method 8270, it is understood that other industry standard methods can benefit in a similar manner.

What is claimed is:

1. A method for operating a mass spectrometer having an ion volume and an electron source for supplying electrons to the ion volume, the method comprising:

(a) performing a tuning or calibration of the mass spectrometer using a tuning standard or a calibration standard provided in the ion volume;

(b) selecting an operational characteristic so as to be a function of an ion intensity produced by ionization of an analysis standard comprising the same or a different tuning standard or the same or a different calibration standard provided in the ion volume during a subsequent plurality of analytical runs, wherein the analysis standard is selected so as to include an internal standard that is used to evaluate a target ion having a target mass-to-charge ratio;

(c) setting, in response to the tuning or calibration, one or more operating parameters that influence a flow of electrons from the electron source into the ion volume so as to establish a low nominal value for an effective emission current from the electron source into the ion volume such that ions produced from a material in the ion volume in response to electrons correspond to a user-specified fixed level of a sensitivity of the mass spectrometer; and (d) repeatedly performing the steps of:

(d1) performing the plurality of analytical runs using the mass spectrometer with the electron source and using the most-recent setting or settings of the one or more operating parameters while monitoring said operational characteristic during the analytical runs, wherein the monitoring includes comparing the ion intensity of the target ion with a predefined ion intensity associated with the internal standard; and (d2) adjusting the setting or settings of the one or more operating parameters in response to the monitoring so as to increase the effective emission current so as to compensate for a degradation of the sensitivity relative to the fixed sensitivity level over time, said adjusting carried out as a function of a difference between the ion intensity of the target ion and the predefined ion intensity.

2. A method according to claim 1, wherein the performing of the plurality of analytical runs includes performing one of the analytical runs with the internal standard.

3. A method for operating a mass spectrometer having an ion volume and an electron source for supplying electrons to the ion volume, the method comprising:

(a) performing a tuning or calibration of the mass spectrometer using a tuning standard or a calibration standard provided in the ion volume;

(b) selecting an operational characteristic so as to be a function of an ion intensity produced by ionization of an analysis standard comprising the same or a different tuning standard or the same or a different calibration standard provided in the ion volume during a subsequent plurality of analytical runs wherein the analysis standard is selected so as to include a first internal standard that is used to evaluate a first target ion having a first mass-to-charge ratio, and a second internal standard that is used to evaluate a second target ion having a second mass-to-charge ratio different from the first mass-to-charge ratio;

(c) setting, in response to the tuning or calibration, one or more operating parameters that influence a flow of electrons from the electron source into the ion volume so as to establish a low nominal value for an effective emission current from the electron source into the ion volume such that ions produced from a material in the ion volume in response to electrons correspond to a user-specified fixed level of a sensitivity of the mass spectrometer; and (d) repeatedly performing the steps of:

(d1) performing the plurality of analytical runs using the mass spectrometer with the electron source and using the most-recent setting or settings of the one or more operating parameters while monitoring said operational characteristic during the analytical runs wherein the monitoring includes comparing the ion intensity of the first target ion with a first predefined ion intensity associated with the first internal standard, and comparing the ion intensity of the second target ion with a second predefined ion intensity associated with the second internal standard; and (d2) adjusting the setting or settings of the one or more operating parameters in response to the monitoring so as to increase the effective emission current so as to compensate for a degradation of the sensitivity relative to the fixed sensitivity level over time, said adjusting carried out as a function of an average of first and second differences, the first difference being a difference between the ion intensity of the first target ion and the first predefined ion intensity and the second difference being a difference between the ion intensity of the second target ion and the second predefined ion intensity.

4. An apparatus comprising a mass spectrometer that includes:

structure defining an ion volume;

an electron source for supplying electrons to the ion volume;

a mass analyzer configured to receive ions from the ion volume; and a controller that:

sets an operating parameter that influences a rate of flow of electrons from the electron source into the ion volume so as to establish a value for an effective emission current from the electron source into the ion volume such that ions produced from a material in the ion volume in response to electrons correspond to a user-specified fixed level of a sensitivity of the mass analyzer;

performs a plurality of analytical runs using the mass spectrometer with the electron source and the established value of the emission current while monitoring an operational characteristic that is a function of an ion intensity produced from a standard in the ion volume in response to electrons, wherein the standard includes an internal standard that is used to evaluate a target ion having a target mass-to-charge ratio and wherein the controller carries out the monitoring by comparing the ion intensity of the target ion with a predefined ion intensity associated with the internal standard; and adjusts the operating parameter in response to the monitoring so as to increase the effective emission current so as to compensate for a degradation of the sensitivity from the fixed level over time, said adjustment carried out as a function of a difference between the ion intensity of the target ion and the predefined ion intensity.

5. An apparatus comprising a mass spectrometer that includes:

structure defining an ion volume;

an electron source for supplying electrons to the ion volume;

a mass analyzer configured to receive ions from the ion volume; and a controller that:

sets an operating parameter that influences a rate of flow of electrons from the electron source into the ion volume so as to establish a value for an effective emission current from the electron source into the ion volume such that ions produced from a material in the ion volume in response to electrons correspond to a user-specified fixed level of a sensitivity of the mass analyzer;

performs a plurality of analytical runs using the mass spectrometer with the electron source and the established value of the emission current while monitoring an operational characteristic that is a function of an ion intensity produced from a standard in the ion volume in response to electrons, wherein the standard includes a first internal standard that is used to evaluate a first target ion having a first mass-to-charge ratio, and a second internal standard that is used to evaluate a second target ion having a second mass-to-charge ratio different from the first mass-to-charge ratio and wherein the controller carries out the monitoring by comparing the ion intensity of the first target ion with a first predefined ion intensity associated with the first internal standard, and comparing the ion intensity of the second target ion with a second predefined ion intensity associated with the second internal standard; and adjusts the operating parameter in response to the monitoring so as to increase the effective emission current so as to compensate for a degradation of the sensitivity from the fixed level over time, said adjustment carried out as a function of an average of first and second differences, the first difference being a difference between the ion intensity of the first target ion and the first predefined ion intensity and the second difference being a difference between the ion intensity of the second target ion and the second predefined ion intensity.

6. A method for operating a mass spectrometer having an ion volume and an electron source for supplying electrons to the ion volume, the method comprising:

(a) performing a tuning or calibration of the mass spectrometer using a tuning standard or a calibration standard provided in the ion volume;

(b) setting, in response to the tuning or calibration, one or more operating parameters that influence a flow of electrons from the electron source into the ion volume so as to establish first and second low nominal values for an effective emission current from the electron source into the ion volume such that ions produced from a material in the ion volume in response to electrons correspond to first and second user-specified fixed levels, respectively, of a sensitivity of the mass spectrometer; and (c) repeatedly performing the steps of:

(c1) performing a plurality of analytical runs using the mass spectrometer with the electron source and using the most recent setting or settings of the one or more operating parameters while monitoring an operational characteristic during the analytical runs; and (c2) adjusting the setting or settings of the one or more operating parameters in response to the monitoring so as to increase the first or second low nominal value of the effective emission current so as to compensate for a degradation of the sensitivity relative to the first or second fixed sensitivity level, respectively, over time, wherein the first low nominal value of the effective emission current corresponds to analyses of ions having a mass-to-charge ratio similar to a first mass-to-charge ratio and wherein the second low nominal value of the effective emission current corresponds to analyses of ions having a mass-to-charge ratio similar to a second mass-to-charge ratio different from the first mass-to-charge ratio.

7. A method according to claim 6, wherein the adjusting includes adjusting each of the first and second low nominal values of the effective emission current in a similar manner.

8. A method according to claim 6, wherein the setting of one or more operating parameters includes setting a particular operating parameter to a first state for use when analyzing ions having a mass-to-charge ratio similar to the first mass-to-charge ratio, and to a second state different from the first state for use when analyzing ions having a mass-to-charge ratio similar to the second mass-to-charge ratio.

9. A method according to claim 8, including introducing into the ion volume an analysis standard comprising the same or a different tuning standard that, in response to electrons from the electron source, produces first ions with the first mass-to-charge ratio and second ions with the second mass-to-charge ratio;

measuring ion intensities of the first and second ions; and adjusting one of the first and second states relative to the other thereof as a function of a difference between the measured ion intensities of the first and second ions.

10. A method according to claim 6, wherein the setting of the one or more operating parameters includes setting a duty cycle of an electron gate that varies the flow of electrons such that a first duty cycle is used when analyzing ions having a mass-to-charge ratio similar to the first mass-to-charge ratio and a second duty cycle different from the first duty cycle is used when analyzing ions having a mass-to-charge ratio similar to the second mass-to-charge ratio.

11. A method according to claim 10, wherein the adjusting of the one or more operating parameters includes adjusting each of the first and second duty cycles in a similar manner.

12. An apparatus comprising a mass spectrometer that includes:

structure defining an ion volume;

an electron source for supplying electrons to the ion volume;

a mass analyzer configured to receive ions from the ion volume; and a controller that:

sets one or more operating parameters that influence a rate of flow of electrons from the electron source into the ion volume so as to establish first and second low nominal values for an effective emission current from the electron source into the ion volume such that ions produced from a material in the ion volume in response to electrons correspond to first and second user-specified fixed levels, respectively, of a sensitivity of the mass analyzer;

performs a plurality of analytical runs using the mass spectrometer with the electron source and the first and second established low nominal values of the emission current while monitoring an operational characteristic; and adjusts the one or more operating parameters in response to the monitoring so as to increase the first or second low nominal value of the effective emission current so as to compensate for a degradation of the sensitivity relative to the first or second fixed sensitivity level, respectively, over time, wherein the first low nominal value of the effective emission current corresponds to analyses of ions having a mass-to-charge ratio similar to a first mass-to-charge ratio and wherein the second low nominal value of the effective emission current corresponds to analyses of ions having a mass-to-charge ratio similar to a second mass-to-charge ratio different from the first mass-to-charge ratio.

* * * * *